(12) United States Patent  
Lim

(10) Patent No.: US 7,443,316 B2  
(45) Date of Patent: Oct. 28, 2008

(54) ENTERING A CHARACTER INTO AN ELECTRONIC DEVICE

(75) Inventor: Swee Ho Lim, Singapore (SG)

(73) Assignee: Motorola, Inc., Schaumburg, IL (US)

( * ) Notice: Subject to any disclaimer, the term of this patent is extended or adjusted under 35 U.S.C. 154(b) by 527 days.

(21) Appl. No.: 11/217,753

(22) Filed: Sep. 1, 2005

(65) Prior Publication Data

US 2007/0046641 A1 Mar. 1, 2007

(51) Int. Cl.
*H03M 1/22* (2006.01)
*H03K 17/94* (2006.01)

(52) U.S. Cl. .................. 341/22; 345/168; 345/173; 382/229; 382/230

(58) Field of Classification Search ............ 341/22; 345/168, 173; 382/229, 230
See application file for complete search history.

(56) References Cited

U.S. PATENT DOCUMENTS 5,963,671 A * 10/1999 Comerford et al. .......... 382/230
6,169,538 B1 * 1/2001 Nowlan et al. .............. 345/168
6,573,844 B1 * 6/2003 Venolia et al. ............... 341/22

* cited by examiner

*Primary Examiner*—Timothy Edwards, Jr.
(74) *Attorney, Agent, or Firm*—Randall S. Vaas

(57) ABSTRACT

A method (300) for entering a character into an electronic device (100) is provided. The method (300) includes displaying (301) input character keys (204) on a touch sensitive region (202) of a display screen (105) of the device (100), the keys identifying an associated character. Next, a display step (309) shows at least one entered character in a display region (201) of the screen, the entered character having been selected by actuation of one of the character keys (204). Next, a group of potential subsequent characters that follow the entered character is predicted (311, 317). A second set of input character keys (205) identifying the potential subsequent characters is displayed (327). The second set of keys (205) are grouped together (323) such that their relative screen locations with respect to each other are different to that of corresponding keys in the first set of keys (204). Finally in receiving (303) and displaying steps (309), the potential subsequent characters are entered adjacent the entered character, the entering having been in response to actuation of one of the second set of keys (205).

18 Claims, 6 Drawing Sheets

ENTERING A CHARACTER INTO AN ELECTRONIC DEVICE

FIELD OF THE INVENTION

The present invention relates generally to the field of character input into an electronic device. The invention is particularly useful for, but not necessarily limited to, entering phone numbers or short text messages into an electronic device having a relatively small touch screen.

BACKGROUND OF THE INVENTION

Portable handheld electronic devices such as handheld wireless communications devices (e.g. cellphones) that are easy to transport are becoming commonplace. Such handheld electronic devices come in a variety of different form factors and support many features and functions.

For purposes of convenience there is a general trend toward miniaturization of many types of handheld electronic devices, specifically handheld wireless communication devices. Miniaturization generally makes it easier to carry the device, including. fitting the device into a user's pocket/purse or attaching the device to a user's belt. Furthermore, touch screens have been used on handheld electronic devices in which the keypad keys are displayed on the touch screen and allow a user to enter text and commands by simply use of a stylus "touching" an area of the screen displaying a key associated with a desired letter or command. Although touch screens are useful and offer ease of use, the trend towards miniaturization has resulted in smaller keys displayed thereon. This can make the keys difficult for the user to locate and select. For example in a QWERTY keyboard, fitting 50 keys onto a display area of typically 2.5 cm by 5 cm results in a key size of about 5 mm by 5 mm. The difficulty in seeing the keys and identifying the wanted key is exacerbated by movement of the user, for example whilst seated on a train or whilst the user moves about the environment. The portability of these devices encourages usage in such circumstances, however the above described method of entering data or commands makes this difficult to achieve satisfactorily.

A related problem is that the small keys are difficult for the user to touch or "click" with a stylus often resulting in the user clicking an adjacent key by mistake. This is both frustrating for the user, and requires additional keystrokes to recover from the mistake. As with the problem of identifying the keys in the first place, the problem of correctly selecting them with a stylus is exacerbated by user movement.

These problems have been addressed to some extent by enlarging the key, and surrounding key, that a user's stylus is located on, so that as the user scans across a small key keyboard, the keys surrounding the tip of the stylus enlarge to make it easier to see and select them. This mechanism is particularly useful if the user is familiar with the keyboard layout and can then go to the area of the screen where a wanted character key resides.

Another method of addressing these problems is with the use of predictive text entry which aims to reduce the number of key strokes required by the user, and hence the identification burden mentioned above as well as the number of mistakes in selecting keys. Predictive text entry uses well known algorithms to predict likely dictionary words based on and containing a number of character keys selected by the user. The word or words are displayed in a different part of the display, and the user can select an appropriate word if it is the one he or she was intending to enter using the keyboard keys. This can reduce the number of keys the user needs to identify and select.

A variation of this method highlights keys on the keyboard which correspond to the next character in each predicted word. This makes it easier for the user to identify the most likely next keys on the keyboard. The algorithm predicts the most likely words the user is trying to input based on characters already entered by the user.

SUMMARY OF THE INVENTION

In general terms in one aspect the present invention provides a method of entering a character into an electronic device such as a mobile phone, smart phone or Personal Digital Assistant (PDA). The method comprises receiving user input corresponding to one or more characters from a full set of characters, for example those from a QWERTY keyboard. These characters may be received by the user selecting a key from a full character set keyboard, a reduced character set keyboard, handwriting recognition, voice recognition, or a copy operation from another set of characters such as a word or part of a word from a previously sent SMS message or recently received email. A number of sequences of characters, such as allowed dictionary words, are predicted based on the received characters. A reduced character set keyboard is then displayed which includes keys corresponding to the next character in each predicted sequence of characters or words.

Throughout this specification the term "key" has the broad meaning of any key, button or actuator having a dedicated, variable or programmable function that is actuatable by a user.

The reduced character set keyboard has keys corresponding to a sub-set of characters compared with the full character set. The keys are grouped together and can be arranged in different relative location or screen co-ordinate relationships compared with keys from a previous reduced character set keyboard or a full character set keyboard, in order to enhance certain data entry advantages as explained in more detail below. Alternatively or additionally, the keys are enlarged when compared with corresponding keys from a full character set keyboard.

The reduced number of keys and the grouping together of the keys makes it easier for the user to identify a wanted key because there are fewer keys to select from and they are concentrated in a smaller area of the key display region; thus the presentation of possible options is less confusing. Furthermore, the reduced number of keys compared with a full character set keyboard allows the reduced character set keys to be larger, and thus easier for the user to see and also to select with a stylus, or even a finger. Again this results in easier identification of the keys and reduced errors compared with trying to select the smaller keys. These advantages also allow greater use of data entry operations of this type to be carried out in circumstances where the user is moving.

Suitably the keys of the reduced character set keyboard are grouped together and arranged in spatial relationships or locations according to their predicted likelihood. For example the most likely next key can be in the centre of a group of the keys so that it is the easiest to locate and select. Such an arrangement may be enhanced by the use of key highlighting such as brightness and/or colour, such that the most likely next key is the easiest to see and focus on for the user. The remaining keys may be located further from the centre of the grouping depending on their predicted likelihood; and similarly their colour, contrast and/or brightness may be varied according to their likelihood.

Additionally or alternatively, the most likely next key may be located over the position of the last entered key from a previous keyboard or set of keys. This means that the user does not need to move their stylus laterally across the keyboard, resulting in reduced user hand movement and hence less fatigue. This compares with using full character set keyboards such as QWERTY keyboards, where for example the movement from a "P" to an "A" may require a 2 cm movement; enough to require the user to lift their hand from the device and move it across to the next letter.

In some cases the new or reduced character set keyboard may be superimposed over a previous set of keys, for example an initial full QWERTY keyboard.

In an embodiment the display comprises three regions, a display region showing entered characters, a first touch-sensitive display region displaying the keys for selection, and a second touch-sensitive region showing the predicted words. Preferably the predicted words are displayed according to their predicted likelihood.

In one aspect the present invention provides a method for entering characters into a small screen device and comprising: receiving user input corresponding to one or more characters from a set of characters; predicting a number of sequences of characters depending on the received characters; displaying a reduced character set keyboard having a number of keys grouped together and each corresponding to the next predicted character in a said respective predicted sequence of characters; the reduced character set keyboard having a unique layout of keys compared with receiving the user input.

In another aspect the present invention provides a method for entering a character into an electronic device, the method including: displaying input character keys on a touch sensitive region of a display screen of the device, the keys identifying an associated character; showing at least one entered character in a display region of the screen, the entered character being selected by actuation of one of the character keys; predicting a group of potential subsequent characters that follow the entered character; displaying a second set of input character keys identifying the potential subsequent characters; entering in the display region one of the potential subsequent characters adjacent the entered character, the entering being in response to actuation of one of the second set of keys; wherein the second set of keys are grouped together such that their relative screen locations with respect to each other are different to that of corresponding keys in the first set of keys.

Suitably in another aspect the present invention provides a method for entering a character into an electronic device, the method including: displaying input character keys on a touch sensitive region of a display screen of the device, the keys identifying an associated character; showing at least one entered character in a display region of the screen, the entered character being selected by actuation of one of the character keys; predicting a group of potential subsequent characters that follow the entered character; displaying a set of enlarged keys over the input character keys, the enlarged keys identifying the potential subsequent characters; and entering in the display region one of the potential subsequent characters adjacent the entered character, the entering being in response to actuation of one of the enlarged keys.

In another aspect the present invention provides an electronic device comprising: a display having touch sensitive region for displaying input character keys identifying an associated character, and a display region; a processor configured to receive an entered character being selected by actuation of one of the character keys, and further configured as a predictive character editor which is arranged to predict a group of potential subsequent characters that follow the entered character; the display screen further configured to show at least one entered character in the display region and a second set of input character keys in the touch sensitive region, the keys identifying the potential subsequent characters; the second set of keys being grouped together such that their relative screen locations with respect to each other are different to that of corresponding keys in the first set of input character keys.

In another aspect the present invention provides a processor program or control code which when implemented on a processor causes it to carry out a method for entering a character into an electronic device, the method including: displaying input character keys on a touch sensitive region of a display screen of the device, the keys identifying an associated character; showing at least one entered character in a display region of the screen, the entered character being selected by actuation of one of the character keys; predicting a group of potential subsequent characters that follow the entered character; displaying a second set of input character keys identifying the potential subsequent characters; entering in the display region one of the potential subsequent characters adjacent the entered character, the entering being in response to actuation of one of the second set of keys; wherein the second set of keys are grouped together such that their relative screen locations with respect to each other are different to that of corresponding keys in the first set of keys. The processor or computer program may be carried on a carrier medium such as a storage medium for example a CD-ROM, or a transmission medium for example a telephony signal.

BRIEF DESCRIPTION OF THE DRAWINGS

In order that the invention may be readily understood and put into practical effect, reference will now be made to an exemplary embodiment as illustrated with reference to the accompanying figures, where like reference numerals refer to identical or functionally similar elements throughout the separate views. The figures together with a detailed description below, are incorporated in and form part of the specification, and serve to further illustrate the embodiments and explain various principles and advantages, in accordance with the present invention where.

Figure 1:
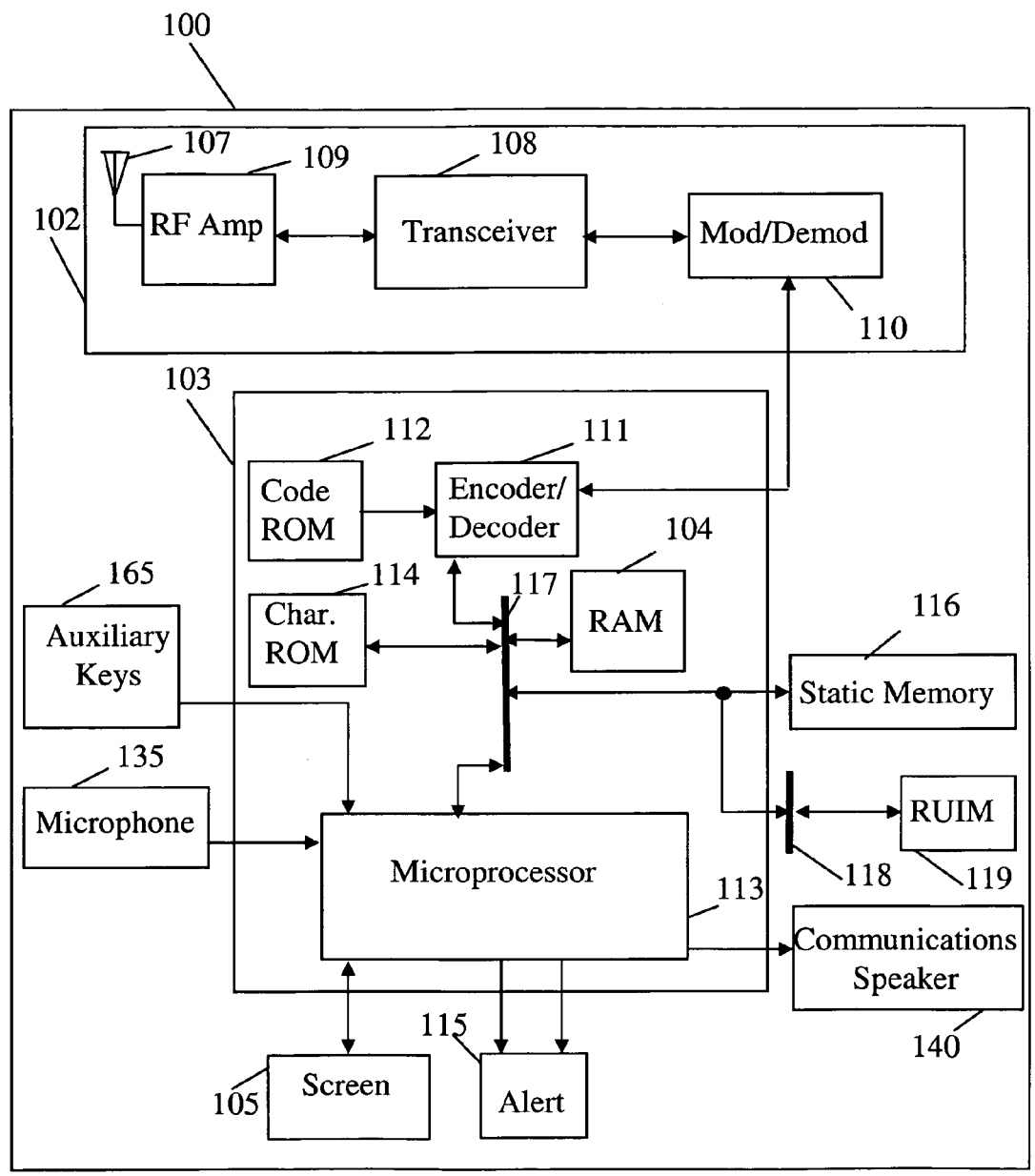
FIG. 1 is a schematic block diagram illustrating circuitry of an electronic device in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to entering characters into an electronic device using a touch sensitive display screen. Accordingly, the device components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising, " or any other variation thereof, are intended to cover a non-exclusive inclusion, such that a method or device that comprises a list of elements does not include only those elements but may include other elements not expressly listed or inherent to such method or device. An element proceeded by "comprises . . . a" does not, without more constraints, preclude the existence of additional identical elements in the process, method, article, or apparatus that comprises the element. Also, throughout this specification the term "key" has the broad meaning of any key, button or actuator having a dedicated, variable or programmable function that is actuatable by a user.

It will be appreciated that embodiments of the invention described herein may be comprised of one or more conventional processors and unique stored program instructions that control the one or more processors to implement, in conjunction with certain non-processor circuits, some, most, or all of the functions of entering characters into an electronic device using a touch sensitive display screen described herein. The non-processor circuits may include, but are not limited to, a radio receiver, a radio transmitter, signal drivers, clock circuits, power source circuits, and user input devices. As such, these functions may be interpreted as steps of a method to perform entering characters into an electronic device using a touch sensitive display screen. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be appreciated that embodiments of the invention described herein may also be comprised of one or more software programs, embodied as processor control code, for example on a carrier medium such as a disk, CD- or DVD-ROM, programmed memory such as read only memory (Firmware), or on a data carrier such as an optical or electrical signal carrier, for example an Internet download. As the skilled person will appreciate, the code may be distributed between a plurality of coupled components in communication with one another.

Referring to FIG. 1, there is a schematic diagram illustrating an electronic device 100, typically a wireless communications device, in the form of a mobile station or mobile telephone comprising a radio frequency communications unit 102 coupled to be in communication with a processor 103. The electronic device 100 also has a touch screen 105 and auxiliary keys 165. There is also an alert module 115 that typically contains an alert speaker, vibrator motor and associated drivers. The touch screen 105, auxiliary keys 165 and alert module 115 are coupled to be in communication with the processor 103.

The processor 103 includes an encoder/decoder 111 with an associated code Read Only Memory (ROM) 112 for storing data for encoding and decoding voice or other signals that may be transmitted or received by the electronic device 100. The processor 103 also includes a micro-processor 113 coupled, by a common data and address bus 117, to the encoder/decoder 111, a character Read Only Memory (ROM) 114, a Random Access Memory (RAM) 104, static programmable memory 116 and a Removable User Identity Module (RUIM) interface 118. The static programmable memory 116 and a RUIM card 119 (commonly referred to as a Subscriber Identity Module (SIM) card) operatively coupled to the RUIM interface 118 each can store, amongst other things, Preferred Roaming Lists (PRLs), subscriber authentication data, selected incoming text messages and a Telephone Number Database (TND phonebook) comprising a number field for telephone numbers and a name field for identifiers associated with one of the numbers in the name field. The RUIM card 119 and static memory 116 may also store passwords for allowing accessibility to password-protected functions on the mobile telephone 100.

The micro-processor 113 has ports for coupling to the touch screen 105, the auxiliary keys and the alert module 115. Also, micro-processor 113 has ports for coupling to a microphone 135 and a communications speaker 140 that are integral with the device.

The character Read Only Memory 114 stores code for decoding or encoding text messages that may be received by the communications unit 102. In this embodiment the character Read Only Memory 114, RUIM card 119, and static memory 116 may also store Operating Code (OC) for the micro-processor 113 and code for performing functions associated with the mobile telephone 100.

The radio frequency communications unit 102 is a combined receiver and transmitter having a common antenna 107. The communications unit 102 has a transceiver 108 coupled to the antenna 107 via a radio frequency amplifier 109. The transceiver 108 is also coupled to a combined modulator/demodulator 110 that couples the communications unit 102 to the processor 103.

Figure 2:
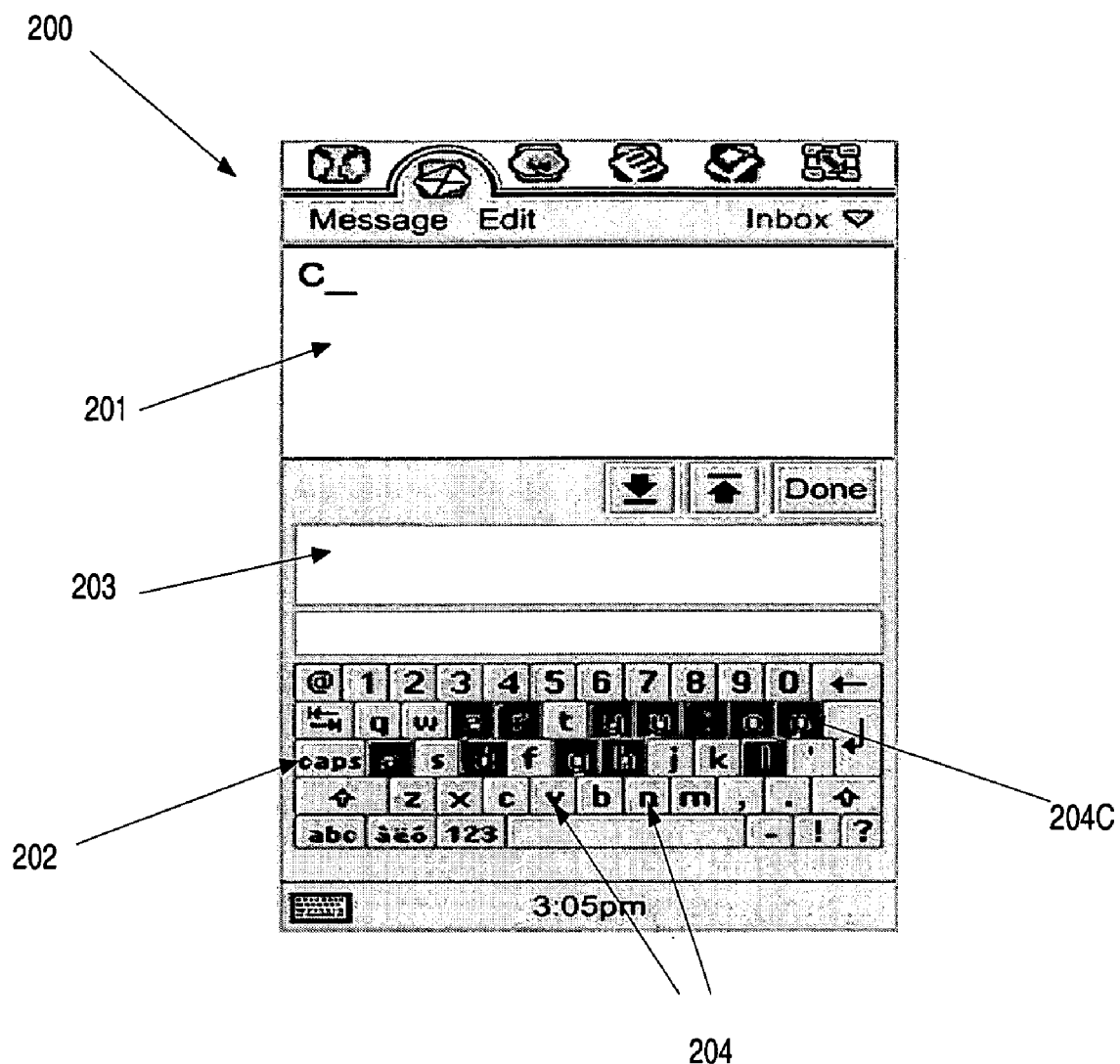
FIG. 2 illustrates an initial touch screen layout with a first set of input character keys displayed on a display screen of the electronic device of FIG. 1.

Referring to FIG. 2, there is illustrated an initial touch screen layout 200 associated with the display screen 105 of the electronic device 100 of FIG. 1. The touch screen layout 200 comprises three regions, a display region 201, a first touch sensitive region 202, and a second touch sensitive region 203. The display region 201 displays text, characters or other data entered by the user, and here shows "C" followed by an input cursor "_". The first touch sensitive region 202 displays an initial keyboard layout having a first set of input character keys 204 each identifying an associated character, and here shows a standard QWERTY keyboard. Characters are input into the device 100 and displayed on the display region 201 by user action on the associated keys 204, for example by touching a corresponding area of the touch screen using a stylus or finger. The second touch sensitive region 203 displays predicted words corresponding to characters entered by the user. These words are also user selectable using contact by a stylus or finger at an appropriate part of the second touch sensitive display region 203.

Predictive text algorithms are well known in the art, and any suitable algorithm may be implemented here. A predictive text algorithm which provides likelihood information associated with each predicted word is typically used according to pre-defined frequency of use statistics. This information can then be used to determine an order identifying which of the predicted or potential words are most likely given the characters already entered by the user. The likelihood information may be a number or a percentage, or any other parameter suitable for use by other applications resident on the device. As is known, the predicted words are drawn from those stored in an on-board dictionary, typically stored in the static memory 116, and may include special terms such as device specific commands for example.

Figure 3:
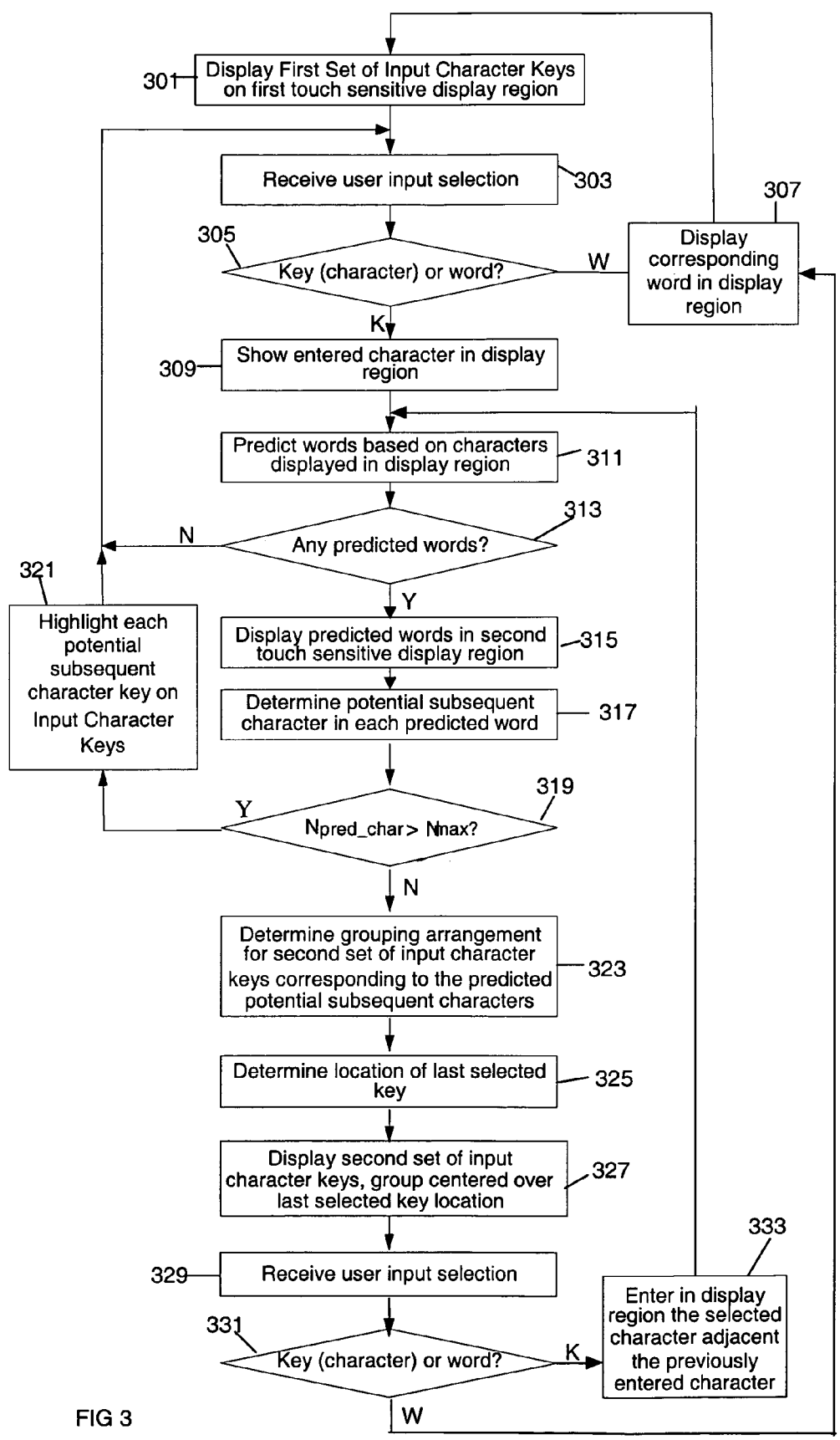
FIG. 3 is a flow diagram illustrating a method for entering a character into the electronic device FIG. 1 in accordance with the present invention.

Referring also to FIG. 3 there is shown a flow diagram of a method 300 of entering a character into the electronic device 100. At step 301 an initial keyboard having a full character set comprising the first set of input character keys 204 is displayed on the first touch sensitive region 202 of the display screen 105 of the device 100. The first set of input character keys 204 each identify an associated character. The electronic device 100 then receives a user selection at step 303, which corresponds to actuation of one of the first set of input character keys 204 or a word from the second touch sensitive region 203. The method 300 then determines whether a key (for example 204) or a word was selected or entered (step 305). If a word was selected (W), this is displayed (step 307) in the display region 201 of the touch screen layout 200, and the method 300 returns to the first step 301 or terminates. If a key was determined as the selected input at step 305 (K), the corresponding entered character, in this case "C", is then shown on the display region 201 of the touch screen 200 at step 309.

Figure 4:
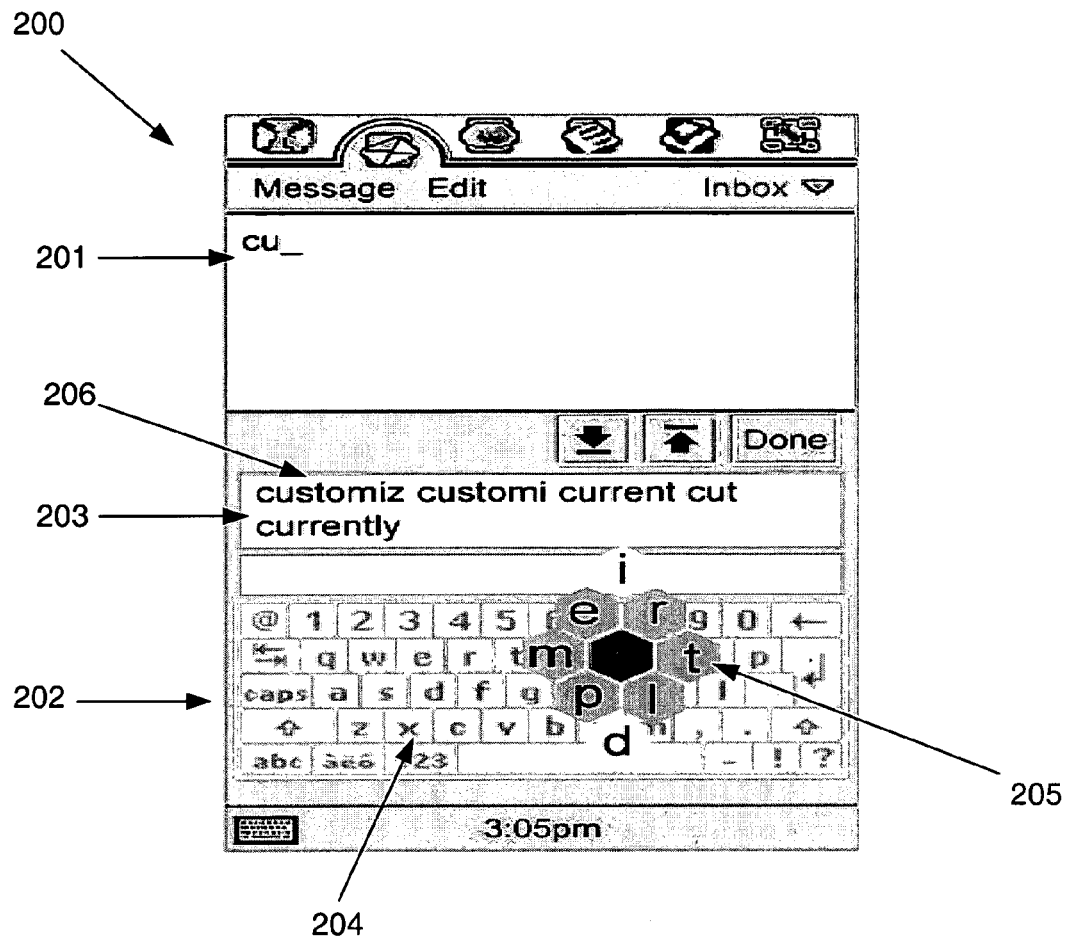
FIG. 4 illustrates the touch screen layout with a second set of input character keys displayed on a display screen of the electronic device of FIG. 1.

At step 311 the device 100 is configured to predict words having the user input characters entered or selected so far by the user. However where there is just one character the number of predicted words could be very large and so this facility is typically disabled for only one input character. At step 313, if there are no predicted words (N), then the method 300 returns to await further user input at step 303. If there are one or more predicted words (Y), resulting from two or more input characters, then these are displayed (step 315) on the second touch sensitive display region 203. This is illustrated in FIG. 4 where further character entry iterations are considered.

Returning to FIG. 2 and FIG. 3, at step 317 the method determines the next or potential subsequent character in each predicted word. Each of these potential subsequent characters is the character in a respective predicted word or string of characters which follows the character which has just been entered or selected by the user following actuation of an associated key 204.

At step 319 the method 300 determines whether the number of potential subsequent characters ($N_{pred\_char}$) exceeds a predetermined number Nmax (ie $N_{pred\_char}$>Nmax). The number of potential subsequent characters $N_{pred\_char}$ is the same as or less than the number of the predicted words that were predicted at step 311. The maximum number Nmax of potential subsequent words is a customisable number which limits the maximum number of input character keys in a second set of input character keys which is described below. In this described implementation Nmax=9, but could in principle be any number less than the number of keys 204 on the initial keyboard. Whether or not the predicted number of potential subsequent characters $N_{pred\_char}$ exceeds the maximum number Nmax determines how keys corresponding to the potential subsequent character will be displayed.

In step 319, the method 300 determines whether $N_{pred\_char}$ is greater than Nmax ((N) in step 319), and if so the method 300 proceeds to step 321 where the next or potential subsequent characters are optionally highlighted in the initial keyboard by changing the colour, grey scale or illumination of the keys associated with these potential subsequent characters—this is indicated by 204C in FIG. 2 and step 321 in FIG. 3. Alternatively the input character keys associated with the potential subsequent characters could optionally be made bold or the other keys greyed out, the next predicted keys could flash, or any other suitable means of highlighting the input character keys of the initial keyboard associated with the potential subsequent characters could be used. By highlighting these next predicted keys, the users focus is turned to these keys which makes it easier to identify the next key he is likely to press, and also easier to select or touch that key as it will stand out compared with the bulk of the keys which will not be coloured.

The example word which is to be input is "customizing", and it can be seen that the next letter, after "C" will be "U" which is highlighted on the QWERTY keyboard of the first or initial touch sensitive display region 202. in FIG. 2. The other letters or characters highlighted are A, E, I, O, D, G, H, L, P, R, and Y, which can each form part of a meaningful or allowed word from the on-board dictionary stored in the static memory 116 when combined with the first letter of the word which is "C".

Referring now to FIG. 4, there is illustrated the touch screen layout having a second set of input character keys 205 displayed or superimposed over the initial or first set of input character keys 204. The second set of input character keys 205 is enlarged compared with the first set of input character keys 204 which make them easier for a user to identify and to select or identify. The second set of input character keys 205 also identify the potential subsequent characters from each of the predicted words. The second set of input character keys 205 are also limited in number compared with the first set of input character keys 204, and in this example are limited to Nmax=9.

The second set of input character keys 205 are grouped together as shown such that the keys are adjacent each other. This is a different screen layout such that the second set of input character keys 205 are grouped together with their relative screen locations with respect to each other being different to that of corresponding keys 204 in the first set of input character keys. By having a different screen layout or arrangement of respective second key locations, certain data entry advantages can be taken advantage of. For example the second set of character input keys 205 can be grouped together rather than being distributed across the display screen region 202 in a manner unrelated to their status as potential subsequent characters; as is the case with the highlighted input character keys 204C of the first set of input character keys 204.

By grouping the second set of input character keys 205 efficiently together, the user need only focus on that part of the first touch sensitive region 202. The grouping also on average reduces the distance between each key in the reduced or second set of input character keys 205 compared with the locations of the equivalent keys in the first set of input character keys 204. This has the advantage of reducing the amount of hand travel required to select the most likely next keys.

Typically, the grouping of the second set of input character keys 205 are positioned or located near the last key actuated on the previous displayed set of input character keys 204. This further reduces the hand travel requirements of the user.

As shown the displayed characters corresponding to the second set of input character keys 205 are grouped or arranged according to an order identifying which of the potential subsequent characters are most likely to follow the entered character, or in other words an order identifying each character's predicted likelihood. In the embodiment this is achieved by locating the key for the character determined as most likely to follow the entered character in substantially the same location as the input character key for the entered character. Additionally the second set of input character keys is located such that their proximity to the centre of the grouping is determined according to their predicted likelihood. In the example shown, this is implemented by locating the key of the most likely potential subsequent character "S" in the centre of the group of keys forming the second set of input character keys 205, the keys of the next most likely characters ("E", "R", "T", "L", "P", "M", "E") adjacent "S", and finally keys of the least likely potential subsequent characters ("I"and "D") adjacent the next most likely keys. This makes it easier on average for the user to identify the character key of interest for selection.

The most likely potential subsequent character key ("S") is located substantially over or about the last selected key ("U"). This increases the chances that the user need not move his hand laterally across the screen at all, and that clicks at the same location will be sufficient to select two or more characters. It also reduces on average the hand travel requirements of the user.

Figure 5:
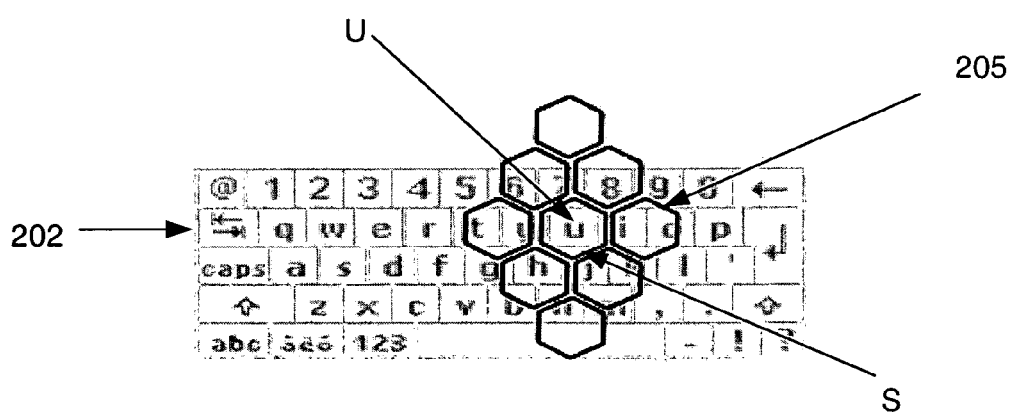
FIG. 5 illustrates a detail of the touch screen layout position of the second set of input character keys in accordance with the present invention 4.

The detail shown in FIG. 5 illustrates the touch screen layout position having this overlapping of keys more clearly. It shows the centre key (referenced "S") of the second set of keys 205 superimposed over the last character key ("U") of the first set of input character keys 204.

The above mentioned ease of selection advantage may be further enhanced by highlighting the keys according to their likelihood; in other words displaying them in a manner associated with an order identifying which of the potential subsequent characters are most likely. For example keys 205 having a high likelihood can be displayed in a different colour compared with those having a lower likelihood. The highlighting could be implemented in different ways, for example different brightness's, contrasts or flashing for example. The highlighting could also be used independently of the likelihood based layout arrangement mentioned above.

The predicted words 206 are entered or displayed in the second touch sensitive region 203 of the touch screen 200 as illustrated in FIG. 4. The group of words each correspond to one of the predicted subsequent characters, and are displayed in a manner associated with the order identifying which of their respective potential subsequent characters are most likely to follow the entered character. For example the word associated with the most likely subsequent potential character is located first in a list of these words. These predicted words 206 are selectable by the user by for example touching the corresponding part of the touch screen region 203 with a stylus. This word selection avoids a greater number of key selections by the user, and therefore reduces hand fatigue and the possibility of mistakes in selecting the keys.

Figure 6:
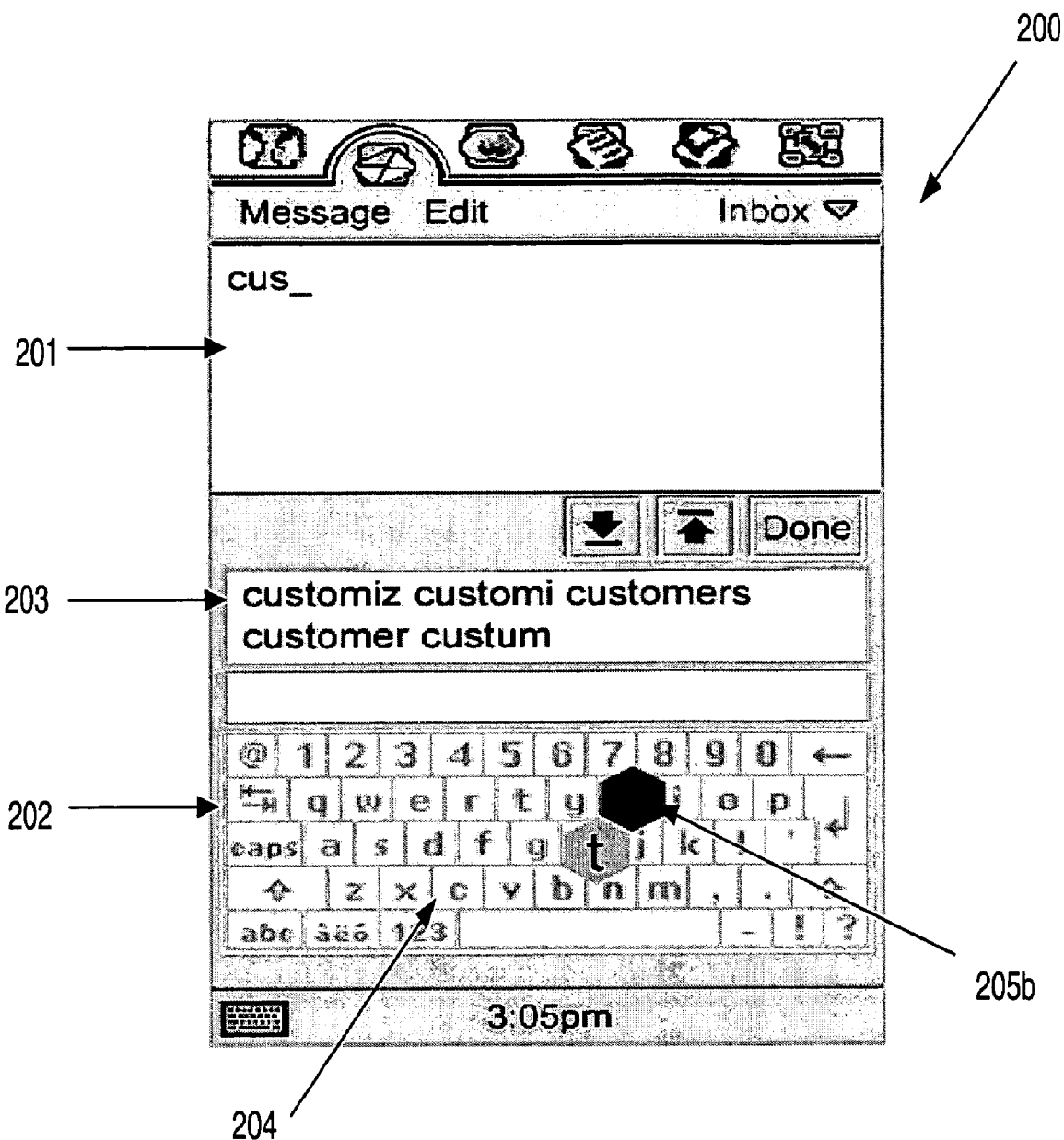
FIG. 6 illustrates a subsequent character entry iteration using another set of input character keys in accordance with the present invention; and FIG. 7

Once the user has selected one of the second set of keys 205 (eg "S"), a subsequent character entry iteration using a another or further set of input character keys 205b is displayed as illustrated in FIG. 6. For the sake of explanatory clarity only this shows two key options—"T"and "H"—which correspond to predicted words having "CUS" already entered. The keys of new set 205b correspond to the potential subsequent characters in the words predicted as a result of the additional selected character ("S") from the previous reduced character set keyboard or previous second set of keys 205. Character "H" is predicted as the more likely key 205b in this example, and is therefore superimposed or simply located over the position of the last selected key "S" from the previous set of keys 205. This reduces the hand movement required by the user to select "H", but also "T" if this was to be selected. This can be seen with a comparison of the locations of the "T" and "H" keys on the underlying QWERTY keyboard 204.

Note that whilst it is preferred to superimpose the "current" set of keys 205 over the initial set of keys 204, it is also possible to display only the current set of keys, or indeed to display all sets of keys (204, 205, 205b and so on). Should the user wish to enter a word not in the on-board dictionary, and hence one that will not be predicted, he may return to the initial keyboard, for example by touching the first touch sensitive region 202 away from the (current) second set of keys 205.

Referring again to FIG. 3 as well as FIG. 4, the method 300 for implementing the above described features is described in more detail. Where the number of predicted potential subsequent characters $N_{pred\_char}$ is less than Nmax as determined at step 319 (Y), a grouping for a second set of input character keys 205 corresponding to these potential subsequent characters is determined 323. The number of characters or keys 205 is reduced compared with the number of keys on the first or initial keyboard 204, and this allows one or a number of advantageous features to be implemented. For example the keys 205 of the second set can be enlarged compared with the first set of keys 204, making them easier to identify and select for the user.

Additionally or alternatively, the keys 205 can have a different spatial relationship with respect to each other in order to reduce the distance between the keys and hence the lateral movement across the first touch sensitive region 202 required by the users hand and/or stylus. Thus the keys can be grouped such that they are adjacent each other. The flexibility in the relative locations of these keys 205 also allows them to be grouped depending on their likelihood, so that for example the proximity of each key to the centre of the grouping is dependent on its predicted likelihood. Furthermore, by grouping the keys together, the users focus is only required in a smaller part of the first touch sensitive region 202 compared with not grouping these keys together as illustrated by the highlighted keys 204C of FIG. 2.

Once the key grouping has been determined, the location on the first touch sensitive region 202 of the last selected key from a previous keyboard or set of keys 204 or 205 is determined at step 325—for example this might be the location of key "U" from FIG. 2, key "S" from FIG. 4, or key "T" from FIG. 6. In step 327, the new or second set of keys 205 are then displayed on the first touch sensitive region 202 of the touch screen 200, such that they are centred over the location determined at step 325. This reduces user hand movement across the touch screen.

The electronic device 100 then awaits receipt of a user selection of a character or word at step 329, which corresponds to actuation of one of the second set of input character keys 205 or a word from the second touch sensitive region 203. However if the word that is desired to be entered is not in the dictionary stored in the static memory then the desired word will not be displayed in region 203 and possibly the desired character will not be displayed as a member second set of input character keys 205. In this scenario, a user can simply touch an area of the region 202 away from the second set of input character keys 205 and the complete set first set of input character keys 204 is displayed and allows selection of all character. The method 300 then determines whether one of the second set of input character keys 205 or a word was selected or entered (step 331). If a word was selected (W), the method 300 returns to step 307 and the word is displayed in the display region 201 of the touch screen layout 200. The method 300 then returns to the first step 301 or terminates. If an input character key was determined (K) as the selected input. at step 331, the corresponding selected character, for example "S" from FIG. 4, is then displayed adjacent the previously selected character ("U") on the display region 201 of the touch screen 200 at step 333. The method then returns to step 311 where a new group of words is predicted dependent on the newly selected character.

Figure 7:
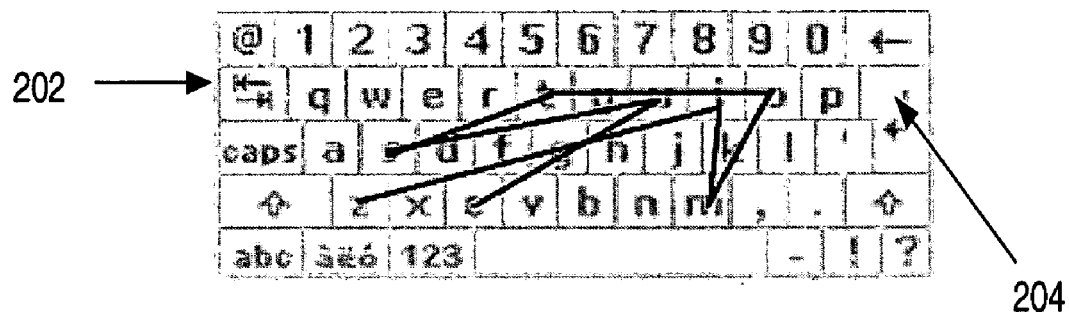
Figure 8:
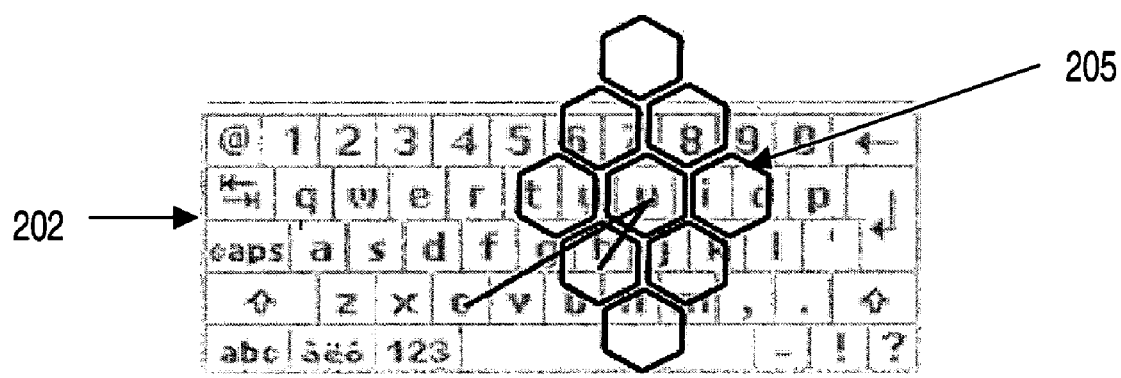
FIG. 8 illustrates the comparative respective hand movement required for a known entry mode and a typical text entry using the present invention.

The reduced hand movement required utilising the above described method of entering characters is illustrated in FIG. 7 and FIG. 8. FIG. 7 shows the path of hand movement across the first touch sensitive region 202 using a standard QWERTY predictive text keyboard to input the word "customizing". FIG. 8 shows the path of hand movement across the same touch screen region 202 using the above described method. The number of clicks will be the same for each input keyboard(s), however as can be seen, the hand movement is much reduced using the new method; and corresponds to a 400% improvement. This is because each key selected can be used as a seed key for the next keyboard to be displayed, such that the key associated with the most likely potential subsequent character is located over the last selected character, this sequence repeating for each iteration of the method 300 for entering a new character. If the most likely potential subsequent character is selected on each new set of keys 205, then there will be no need for the user's hand or stylus to move across the screen—once the second set of keys 205 start being displayed. If one of the less likely potential subsequent character keys is selected which is not located in substantially the same screen location or co-ordinates as the last selected key, then this newly selected key will become the seed key (ie central location) for the next key grouping 205, which will then be centred over this seed key's location.

The described embodiments are especially well suited to facilitate improved data entry in portable or other small screen devices such as mobile phones, smart phones, PDA's, portable media devices and the like. However other types of devices may also benefit from the described methods and apparatus. The embodiments may be used for example for entering text into email or SMS messages, or phone number, address and name information into a phone book database. Various other data entry and command entry applications can also be envisioned.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims.

I claim:

1. A method for entering a character into an electronic device, the method including:
   displaying a first set of input character keys on a touch sensitive region of a display screen of the device, each key in the first set of input character keys identifying an associated character;
   showing at least one entered character in a display region of the screen, the entered character being selected by actuation of one of the character keys;
   predicting a group of potential subsequent characters that follow the entered character;
   displaying a second set of input character keys identifying the potential subsequent characters;
   entering in the display region one of the potential subsequent characters adjacent the entered character, the entering being in response to actuation of one of the second set of keys;
   wherein the second set of input character keys are grouped together such that their relative screen locations with respect to each other are different to that of corresponding keys in the first set of input character keys.

2. A method for entering a character into an electronic device as claimed in claim 1, wherein the second set of input character keys are enlarged compared with the first set of input character keys.

3. A method for entering a character into an electronic device as claimed in claim 1 further comprising superimposing the second set of input character keys over the first set of input character keys.

4. A method for entering a character into an electronic device as claimed in claim 1, wherein the predicting includes determining an order identifying which of the potential subsequent characters are most likely to follow the entered character.

5. A method for entering a character into an electronic device as claimed in claim 4, wherein the second set of input character keys are displayed in a manner associated with the order.

6. A method for entering a character into an electronic device as claimed in claim 5, wherein displaying the second set of input character keys is further characterised by locating the key for the character determined as most likely to follow the entered character in substantially the same location as the input character key for the entered character.

7. A method for entering a character into an electronic device as claimed in claim 5, wherein the second set of input character keys is highlighted according to their predicted likelihood.

8. A method for entering a character into an electronic device as claimed in claim 5, wherein the second set of input character keys is located such that their proximity to the centre of the grouping is determined according to their predicted likelihood.

9. A method for entering a character into an electronic device as claimed in claim 4, further comprising entering in a second touch sensitive region of the display screen a group of words each corresponding to one of the predicted subsequent characters, and wherein the words are displayed in a manner associated with the order identifying which of their respective potential subsequent characters are most likely to follow the entered character.

10. An electronic device comprising:
- a display having touch sensitive region for displaying a first set of input character keys identifying an associated character, and a display region;
- a processor configured to receive an entered character being selected by actuation of one of the first set of input character keys, and further configured as a predictive character editor which is arranged to predict a group of potential subsequent characters that follow the entered character;
- the display screen further configured to show at least one entered character in the display region and a second set of input character keys in the touch sensitive region, the keys identifying the potential subsequent characters;
- the second set of input character keys being grouped together such that their relative screen locations with respect to each other are different to that of corresponding keys in the first set of input character keys.

11. A device as claimed in claim 10, wherein the second set of input character keys are enlarged compared with the first set of keys.

12. A device as claimed in claim 10 wherein the display is further configured to superimpose the second set of input character keys over the first set of input character keys.

13. A device as claimed in claim 10, wherein the predictive character editor is configured to determine an order identifying which of the potential subsequent characters are most likely to follow the entered character.

14. A device as claimed in claim 13, wherein the display is configured to display the second set of input character keys in a manner associated with the order.

15. A device as claimed in claim 14, wherein the display is further configured to locate the second character key for the character determined as most likely to follow the entered character in substantially the same location as the input character key for the entered character.

16. A device as claimed in claim 14, wherein the display is configured to highlight the second set of input character keys according to their predicted likelihood.

17. A device as claimed in claim 14, wherein the display is configured to arrange the second set of keys such that their proximity to the centre of the grouping is determined according to their predicted likelihood.

18. A device as claimed in claim 13, wherein the display is further configured to enter in a second touch sensitive region of the display a group of words each corresponding to one of the potential subsequent characters, and wherein the words are displayed in a manner associated with the order identifying which of their respective potential subsequent characters are most likely to follow the entered character.

* * * * *